Nov. 18, 1947.  W. H. BOLDINGH  2,430,904
RECTIFYING INSTALLATION COMPRISING BLOCKING-LAYER CELLS
Filed Jan. 11, 1943  3 Sheets-Sheet 2

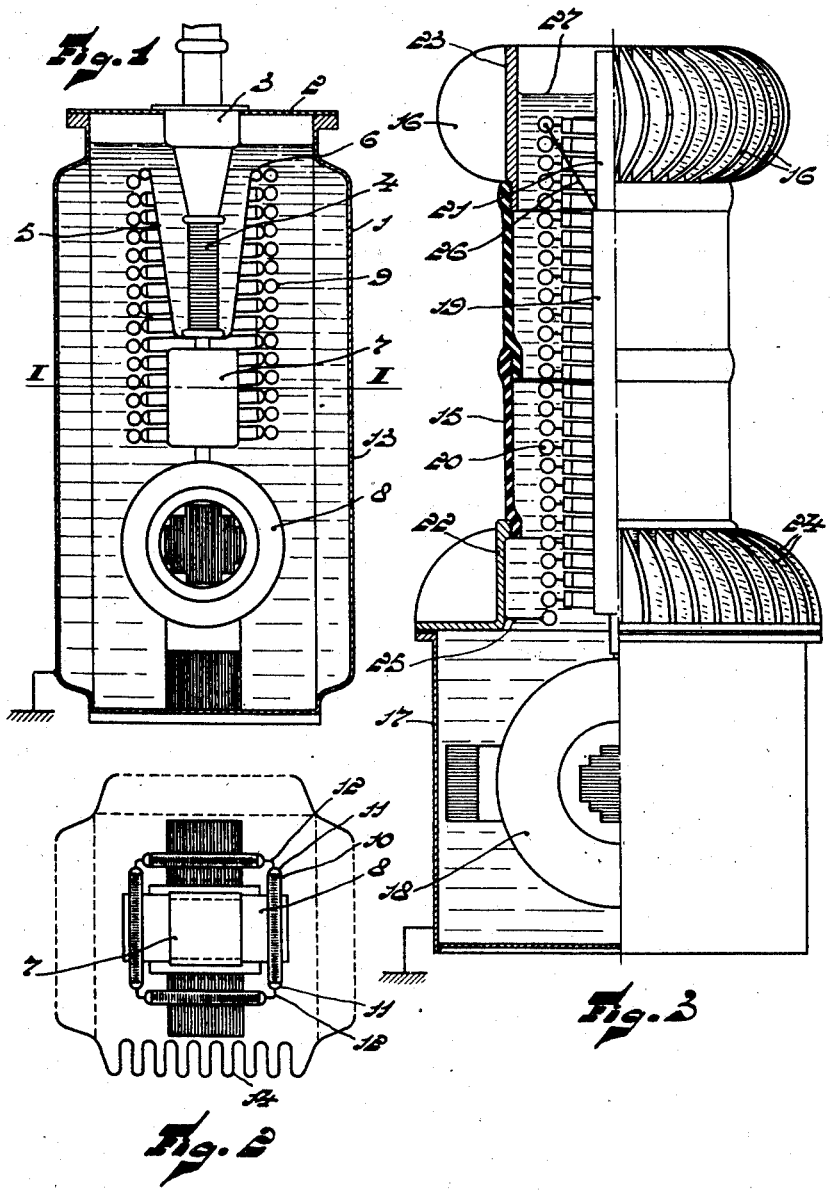

Inventor
Willem Hondius Boldingh
By (signature)
Attorney

Inventor,
Willem Hondius Boldingh
By Lee B. Kemon.
Attorney

Patented Nov. 18, 1947

2,430,904

UNITED STATES PATENT OFFICE 2,430,904

RECTIFYING INSTALLATION COMPRISING BLOCKING-LAYER CELLS

Willem Hondius Boldingh, Eindhoven, Netherlands, assignor to Hartford National Bank and Trust Company, Hartford, Conn., as trustee Application January 11, 1943, Serial No. 472,076
In the Netherlands January 27, 1941

Section 1, Public Law 690, August 8, 1946.
Patent expires January 27, 1961

3 Claims. (Cl. 175—366)

In rectifying alternating current with the aid of blocking-layer cells, for example selenium cells, the voltage allowable for each cell is not much more than 30 volts. For rectifying currents at a high voltage a large number of cells have therefore to be connected in series, so that a battery of stacked blocking-layer cells acquires a considerable height. For a total voltage of, say, 100 kv. and an average voltage for each cell of 20 v. there are required 5000 cells. With a height of 1.5 mms. for each cell we thus obtain a total height of 7.5 ms. Since it is, of course, impossible to arrange a stack of cells of such height, it is divided into groups each consisting, for example, of a few tens of cells which are united to form a rod-shaped element. For this purpose the cells are stacked up in a tube of insulating material or again they are provided with a central aperture and strung on a pin.

The invention suggests a solution for arranging a large number of such rectifier elements in such manner that the whole of it occupies little space and that notwithstanding a satisfactory dissipation of the heat losses remains ensured. According to the invention, a chain of rod-shaped rectifier elements connected in series is wound in the form of a tube.

This arrangement is particularly suitable if the rectifying installation comprises, in addition, other parts such as condensers and resistances. The longitudinal dimension of such parts is as a rule only small in comparison with that of the total length of the chain of rectifying cells, but, if the latter is wound in the form of a tube the dimensions need not be much different. With an arrangement according to the invention these condensers and other parts may be arranged within the tube formed by the rectifier elements, which implies an efficient use of the space.

Owing to the arrangement in the form of a tube we obtain the further advantage that the voltage between two neighbouring elements remains comparatively low, that is to say that it does not exceed the voltage across the ends of the entire chain divided by the number of turns.

The tube formed by the rectifier elements may be arranged, jointly with the transformer which furnishes the current to be rectified, inside a common envelope. Owing to the large quantity of metal of which the transformer consists, the latter represents a comparatively large weight. In order to increase the stability of the installation it is therefore recommended to arrange the tube of rectifier elements in vertical position above the transformer.

In order to reduce the spacings necessary between parts which exhibit a potential difference relatively to one another and to be able to dissipate the heat developed in the cells easily to the wall of the envelope, the latter may be filled with an insulating liquid such as transformer oil or a hydrocarbide containing chlorine or fluorine (for example carbon tetrachloride).

The envelope may be provided in this case with a base which encloses the transformer, and with a column-shaped part which has a smaller diameter than the base and which encloses the tube of rectifier elements.

The arrangement according to the invention may also be advantageously utilized in the case of a rectifying installation in cascade-arrangement, i. e. a series-connection of rectifiers, wherein every two successive rectifiers or groups of rectifiers are bridged by a condenser so that two rows of condensers are produced. These rows of condensers may be arranged side by side and the rectifier elements may be wound thereon, in such manner that each condenser is surrounded by a chain of rectifiers which pertain to the same storey as the condenser.

An advantageous form of construction is obtained in this case if the condensers each consist of two parts connected in series, which are arranged in such manner that each time the upper part of a condenser of the one row is located at the same height as the lower part of a condenser of the other row.

Preferably, each storey is placed in this case within a cylinder of insulating material and a metal ring is provided between the successive cylinders. In this case the column is consequently subdivided by metal rings into sections which each enclose a storey of the cascade-arrangement. In order to avoid corona sharp edges on the outside of these rings should be avoided.

If desired, to these rings, which are connected to the beginning of the superjacent and to the end of the subjacent storey, may be connected as an intermediate tap a conductor for the subdivision of the voltage.

The invention will be explained more fully with reference to the accompanying drawing, which represents, by way of example, a few forms of construction of rectifying installations according to the system described.

Fig. 1 is a longitudinal section of a generator for 100 kv. and 30 ma. in Villard-arrangement which may serve for the supply of an X-ray tube.

Fig. 2 is a section of the same device on the line I—I.

Fig. 3 represents, partly in elevation and partly in section, a similar device.

Figure 4:
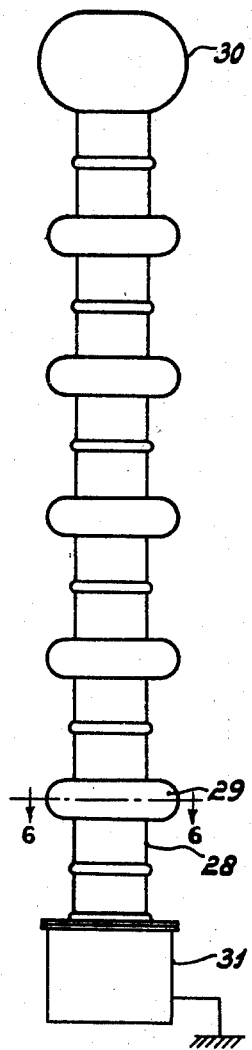
Fig. 4 represents an elevation of a generator in cascade-arrangement.

In Fig. 1, 1 denotes a metal casing closed by a metal cover 2. To the latter is centrally secured a leading-in insulator 3 from which hangs a damping resistance 4 which carries at the opposite end a metal screening cap 5. The latter surrounds the resistance 4 like a cup and has a flanged edge 6. From the lower end of the resistance 4 hangs furthermore a condenser 7 and on the bottom of the casing stands a transformer 8 for a primary voltage of, for example, 220 v. The secondary winding of this transformer, in which a high voltage with a maximum value of 55 kv. is set up, is connected in series with the condenser 7 and the resistance 4. That end of the secondary transformer winding which is not connected to the condenser is connected to the wall of the casing.

The condenser 7 and the screening cap 5 are surrounded by a tube 9 formed by helically wound rectifier elements which are connected in series. One of the ends of the chain is connected to the cap 5 and the other end to the wall of the casing. Each element consists of a round tube 10 of ceramic material or glass which is closed at both ends by means of a cap 11 which may consist of metal as well as of insulating material and which is filled with stacked selenium cells in the form of tablets which exactly fit into the tube. The adjacent caps of two successive tubes are connected to one another by means of a metal rod 12. The rectifying cells have, for example, a diameter of 14 mms. and a thickness of 1.5 mms. Such cells may be loaded with a current intensity of 35 ma. and in the nonconductive direction they can sustain a voltage of 30 v. If each tube contains 96 cells, approximately 60 tubes afford, for a total voltage of 100 kv., sufficient security.

The elements are arranged in such manner that the horizontal projection of the wound tube forms a square as may be seen from Fig. 2. It would also be possible to choose any other arrangement, for example, six tubes in a hexagon or a figure which, after one turn, is not closed. It has been found that in a determined circle four tubes in a square can contain more cells than is the case with any other arrangement, owing to the comparatively larger loss of space in the latter case.

The casing is filled with an insulating liquid, such as transformer oil, by which the heat lost in the transformer, the rectifier elements and the resistance 4 is dissipated to the wall 13 of the casing. In order to ensure an easy transfer of heat from this wall to the surrounding air, this wall is made from corrugated sheet iron, as is indicated at 14. The lateral surface may thus become about four times as large as that of a flat wall. During operation the wall 13 is connected to earth.

A conductor insulated against high voltages and provided with an earthed sheath may be connected to the leading-in insulator 3 and by means of this conductor direct current may be supplied to the anode of an X-ray tube whose cathode is connected to earth. In this case the selenium cells must be arranged in such manner that they do not pass current if the potential of that end of the chain which is connected to the cap 5 is positive with respect to the end connected to the wall 13. Apart from the losses of voltage in the resistance 4 and the rectifier cells, the conductor starting from the generator has in this case a voltage which varies between zero and twice the maximum value of the secondary transformer voltage.

With the device shown in Fig. 3, which is suitable for a voltage of 200 kv., part of the casing is formed by a cylinder 15 of insulating material which is composed of two portions. On the cylinder is placed a metal cap 23 provided with cooling ribs 16. When the device is in operation the cap acquires the whole of the voltage furnished by the generator. A leading-in insulator is not utilized in this case since this involves difficulties for a voltage of 200 kv.

The cylinder is placed on a metal base 17 in which a transformer 18 is housed. Within the cylinder is a condenser 19 and which is coaxially surrounded, in a similar manner as with the device of Fig. 1, by the cage of rectifier elements 20. The total number of selenium cells amounts approximately to 10,000. Above the condenser there is a damping resistance 21 which connects the condenser to the cap.

The cylinder 15 is supported by an intermediate piece 22 of metal which is provided, as is the cap 23, with cooling ribs 24. In order to avoid corona, the said ribs have a circular shape. The transformer, the condenser, the rectifiers and the damping resistance are connected in a similar manner as in Fig. 1. The casing 17 is connected to earth. The connection of the lower end of the chain of rectifiers with the casing and that of the upper end with the condenser are denoted at 25 and at 26 respectively.

Up to the level 27 the device is filled with an insulating liquid (transformer oil) which serves to insulate the various parts relatively to one another and relatively to the metal wall portions and to transfer the heat to the wall.

Referring to Fig. 4, a column comprising six cylindrical sections 28 constructed in a manner similar to cylinder 15 of Fig. 3 and separated by metallic rings 29 which may be provided with cooling ribs houses a high-voltage generating installation. The column rests on a base 31 housing a transformer 32 shown in Figs. 5 and 7.

Figure 5:
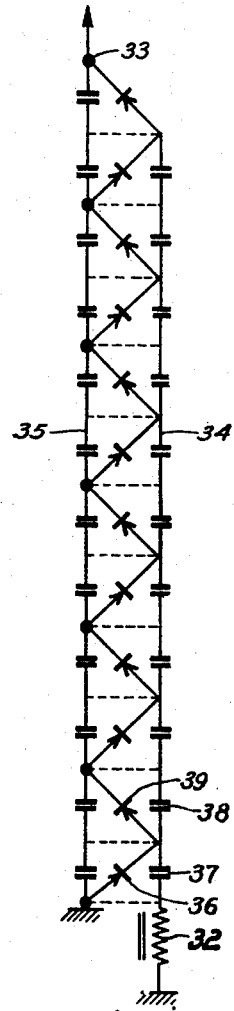
Fig. 5 shows the wiring diagram of this generator.
Figure 6:
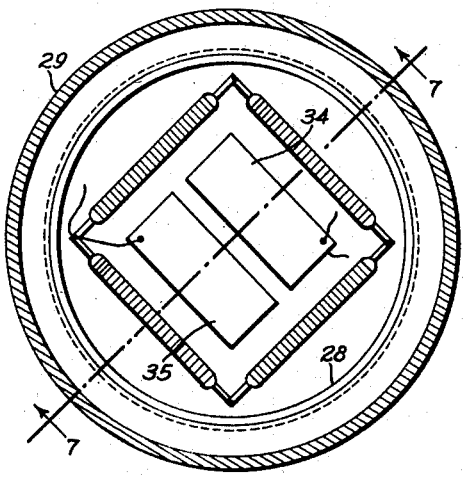
Figure 6 is a sectional view taken along the line 6—6 of Figure 4 in the direction indicated by the arrows.
Figure 7:
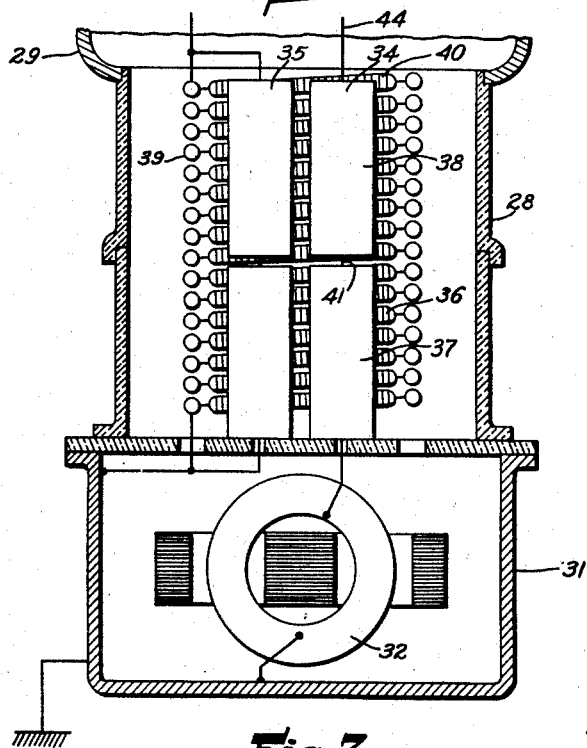
Figure 7 is a sectional elevation view taken along the line 7—7 of Figure 6.

The internal assembly within the column is shown in Figs. 6 and 7 while the schematic wiring arrangement of the elements of the structure is shown in Fig. 5. Referring first to Fig. 5, it will be apparent that the installation provides a circuit arrangement for supplying a high potential at the terminal 33 with respect to ground. The arrangement consists of parallel rows of capacitors 34 and 35 connected in series with blocking layer rectifiers 36 connected across alternate sections of the capacitors in a ladder arrangement. Each of the capacitors comprises two sections 37 and 38 and with the rectifiers arranged in cascade across successive levels of the capacitors, the voltage between any point on the rectifier ladder and the capacitor at any stage will not exceed the maximum potential at the secondary of the transformer. With this arrangement, the voltage builds up at the successive rectifying levels so that any multiple of the secondary voltage of the transformer is achieved. With the installation illustrated it is practicable to obtain approximately 1000 kv. with a current output of about 3 ma.

The construction of the installation can be seen from Figs. 6 and 7 wherein capacitors 34 and 35 are disposed within the column 28 and are surrounded by rectifying element 36 comprising a plurality of blocking layer cells connected in series and formed into tubular elements as shown in Fig. 2 and helically wound around the capacitors. Each of the said capacitors comprises two sections 37 and 38 corresponding to the capacitors in Fig. 5. The rectifying element 40 comprises two series connected rectifiers 36 and 39 comprising a plurality of rod-like elements corresponding to the rectifiers shown in Fig. 5. The mid-point of the rectifier is connected to the mid-point of the capacitor 34 by a short connecting lead 41. The lower section 37 of capacitor 34 is connected to transformer 32 housed in base 31. The low potential side of rectifier 33 is connected to base 31 together with the lower section of capacitor 35. The secondary of transformer 32 is also grounded to the housing. The second rectifier 39 together with the upper section of capacitor 35 is connected to the second section through lead 44. Intermediate voltage taps are provided at the several stages of the rectifier cascade by connections to the screening rings 29.

The entire column is filled with insulating liquid. The screening rings 29 and the terminal 30 may be formed so as to act as oil expansion chambers.

What I claim is:
1. A voltage-rectifying assembly comprising a plurality of blocking-layer cells connected in series relationship and forming a plurality of rod-shaped elements, a plurality of condensers arranged in two adjacent rows, said elements being connected end to end in series relationship and being wound in the form of a tube surrounding said condensers, and said elements and said condensers being electrically interconnected in cascade relationship to form a plurality of superposed voltage generating sections and being so positioned with respect to each other that the interconnected elements and condensers are adjacent to each other, all of said elements being symmetrically arranged about a common axis so that the interconnection portions are approximately alike in physical and electrical characteristics.

2. A voltage-rectifying assembly comprising a plurality of blocking-layer cells connected in series relationship and forming a plurality of rod-shaped elements, a plurality of condensers arranged in two adjacent rows, said elements being connected end to end in series relationship and being wound in the form of a tube surrounding said condensers, said elements and said condensers being electrically connected in cascade relationship and being so positioned with respect to each other as to form a plurality of superposed voltage generating sections, the condensers in each row each consisting of two series connected superimposed parts and being so arranged that the upper part of a condenser of one row is adjacent to the lower part of a condenser of the other row.

3. A voltage-rectifying assembly as claimed in claim 1 wherein the cascade connected rectifier elements and condensers are surrounded by a column-shaped envelope comprising a plurality of superposed electrical insulating members with interposed metal ring members having rounded external edges, the superposed voltage generating sections being enclosed within the insulating members and bounded by the ring members.

WILLEM HONDIUS BOLDINGH.

REFERENCES CITED

The following references are of record in the file of this patent:

UNITED STATES PATENTS

| Number | Name | Date |
|---|---|---|
| 1,768,865 | Smalley | July 1, 1930 |
| 1,842,716 | Ferranti | Jan. 26, 1932 |
| 1,905,629 | Corbitt | Apr. 25, 1933 |
| 2,022,644 | Ashcraft | Dec. 3, 1935 |
| 2,169,109 | Muller | Aug. 8, 1939 |
| 2,189,887 | Jones | Feb. 13, 1940 |

FOREIGN PATENTS

| Number | Country | Date |
|---|---|---|
| 584,115 | Germany | Sept. 15, 1933 |